US005093766A

United States Patent [19]

Masuyama et al.

[11] Patent Number: 5,093,766

[45] Date of Patent: Mar. 3, 1992

[54] HEADLAMP FOR VEHICLE

[75] Inventors: Kouichi Masuyama, Yokohama; Shigeru Sakayauchi, Tokyo, both of Japan

[73] Assignee: Stanley Electric Co., Ltd., Japan

[21] Appl. No.: 605,922

[22] Filed: Oct. 30, 1990

[30] Foreign Application Priority Data

Nov. 2, 1989 [JP] Japan ............................ 1-128485[U]

[51] Int. Cl.[5] ............................................ B60Q 1/04

[52] U.S. Cl. ...................................... 362/61; 362/346; 362/299; 362/308; 362/302

[58] Field of Search .................. 362/61, 80, 346, 302, 362/303, 304, 305, 299, 347, 349, 296, 297, 308

[56] References Cited

U.S. PATENT DOCUMENTS

| | | | |
|---|---|---|---|
| 4,208,704 | 6/1980 | Draper | 362/61 |
| 4,386,824 | 6/1983 | Draper | 362/346 |
| 4,680,679 | 7/1987 | Dilouya | 362/61 |
| 4,754,374 | 6/1988 | Collot | 362/80 |
| 4,772,988 | 9/1988 | Brun | 362/61 |
| 4,800,467 | 1/1989 | Lindae et al. | 362/61 |
| 4,924,359 | 5/1990 | Lindae et al. | 362/80 |
| 4,928,214 | 5/1990 | Oyama | 362/61 |
| 4,953,063 | 8/1990 | Nino | 362/61 |
| 4,992,911 | 2/1991 | Ressia | 362/346 |

*Primary Examiner*—Ira S. Lazarus

*Assistant Examiner*—D. M. Cox

*Attorney, Agent, or Firm*—Louis Weinstein

[57] ABSTRACT

A headlamp for a vehicle adapted to radiate a light beam therefrom exclusively for passing-by vehicles includes a single filament, a main reflector, an auxiliary reflector and a lens. The auxiliary reflector is divided into two parts, i.e., an upper auxiliary reflector and a lower auxiliary reflector along a horizontal line extending through the filament. The upper auxiliary reflector, has a focus which is located at the position in the vicinity of the rearmost end of the filament, while the lower auxiliary reflector has a focus which located at the position in the vicinity of the foremost end of the filament. The auxiliary reflector is basically arranged in the region where the main reflector can not completely collect a light beam radiated from the filament. The upper and lower auxiliary deflectors have an inner diameter and an outer diameter, respectively. The inner diameter is dimensionally defined such that it is located on the lens side outward of line segments extending from the foremost end of the filament to the outermost ends of the main reflector, and the outer diameter is set to substantially the same diameter as that of the region where the function of a part of the main reflector becomes ineffective due to arrangement of sockets for the filament.

8 Claims, 1 Drawing Sheet

HEADLAMP FOR VEHICLE

BACKGROUND INVENTION

1. Field of the Invention

The present invention relates generally to a headlamp mounted on an automotive vehicle or the like. More particularly, the present invention relates to a vehicular headlamp including a single filament for radiating a light beam therefrom exclusively for passing-by vehicles.

2. Description of the Related Art

A conventional headlamp of the foregoing type has been typically disclosed in an official gazette of Japanese Laid-Open Patent NO. 64-14801 (corresponding to Japanese Patent Application NO. 62-170620) which was filed by the common applicant to the present invention. According to the prior invention, an auxiliary reflective mirror is arranged for the headlamp including double filaments, i.e., a filament for radiating a light beam therefrom for the purpose of normal running and a filament for radiating light beam therefrom for passing-by vehicles.

In the past era when the foregoing prior invention was filed with the Patent Office in this country, a four lamp type headlamp including two lamps of type 1 and two lamps of type 2 was officially approved by the Transportation Ministry in this country. Specifically, the lamps of type 1 are used for radiating light beam therefrom for the purpose of normal running and the lamps of type 2 are used such that a light beam for the purpose of normal running is changed to a light beam for passing-by vehicles and vice versa during running of a vehicle. When the vehicle runs in a suburb at a high speed, both lamps of type 1 and type 2 are turned on but when the vehicle runs on streets in a city at a low speed, the lamps of type 2 only are turned on with a light beam for passing-by vehicles. Accordingly, in that era, there was no industrial requirement for mounting on a vehicle a headlamp adapted to radiate a light beam therefrom exclusively for passing-by vehicles.

However, as time elapses, things vary. In recent years, a simplified four lamp type headlamp has been officially approved by the Transportation Ministry wherein lamps of type 1 are used for radiating a light beam exclusively for the purpose of running and lamps of type 2 are used for radiating a light beam exclusively for passing-by vehicles. When the vehicle runs with a light beam exclusively for a passing-by vehicle, the lamps of type 2 only are turned on and when the vehicle runs with light beam for the purpose of normal running, the lamps of type 1 are turned on in addition to the filaments of type 2. Thus, there has arisen a new industrial requirement for providing a headlamp adapted to radiate a light beam therefrom exclusively for passing-by vehicles. However, it has been found that the hitherto known technology can not meet the foregoing requirement satisfactorily.

SUMMARY OF THE INVENTION

The present invention has been made with the foregoing background in mind.

An object of the present invention is to provide a headlamp for a vehicle including a single filament for radiating light beam therefrom exclusively for passing-by vehicles wherein the problem of the conventional headlamp as mentioned above is entirely eliminated.

Another object of the present invention is to provide a headlamp for a vehicle including a single filament for radiating a light beam therefrom exclusively for passing-by vehicles wherein the headlamp is simple in structure and can be fabricated at an inexpensive cost.

To accomplish the above objects, the present invention provides a headlamp for a vehicle including a single filament, a main reflector in the shape of a rotational paraboloid with upper and lower end parts cut off therefrom to assume a slender rectangular shape extending in the lateral direction of the vehicle, an auxiliary reflector in the shape of truncated rotational paraboloid of which focus is located at the position assumed by the filament or at the position in the vicinity of the foregoing position and a lens arranged at the foremost end of the headlamp, wherein the filament serves as a filament for radiating a light beam therefrom exclusively for passing-by vehicles; the auxiliary reflector is divided into two parts, i.e., an upper auxiliary reflector and a lower auxiliary reflector, along a horizontal line extending through the filament or the position in the vicinity of the same; and the upper auxiliary reflector arranged above the horizontal line has a focus which is located at the position in the vicinity of the rearmost end of the filament and the lower auxiliary reflector arranged below the horizontal line has a focus which is located at the position in the vicinity of the foremost end of the filament.

Basically, the auxiliary reflector is arranged in the region where the main reflector can not completely collect a light beam radiated from the filament.

The upper auxiliary reflector is contoured in the shape of a rotational paraboloid whose focus is located at the position in the vicinity of the rearmost end of the filament.

Similarly, the lower auxiliary reflector is contoured in the shape of a rotational paraboloid whose focus is located at the position in the vicinity of the foremost end of the filament.

The upper and lower auxiliary reflectors have an inner diameter and an outer diameter, respectively. The inner diameter is dimensionally defined such that it is located on the lens side outward of line segments extending from the foremost end of the filament to the outermost ends of the main reflector, while the outer diameter is set to substantially the same diameter as that of the region where the function of a part of the main reflector becomes ineffective due to arrangement of sockets for the filament.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

Now, the present invention will be described in detail hereinafter with reference to the accompanying drawings which illustrate a preferred embodiment of the present invention.

Figure 1:
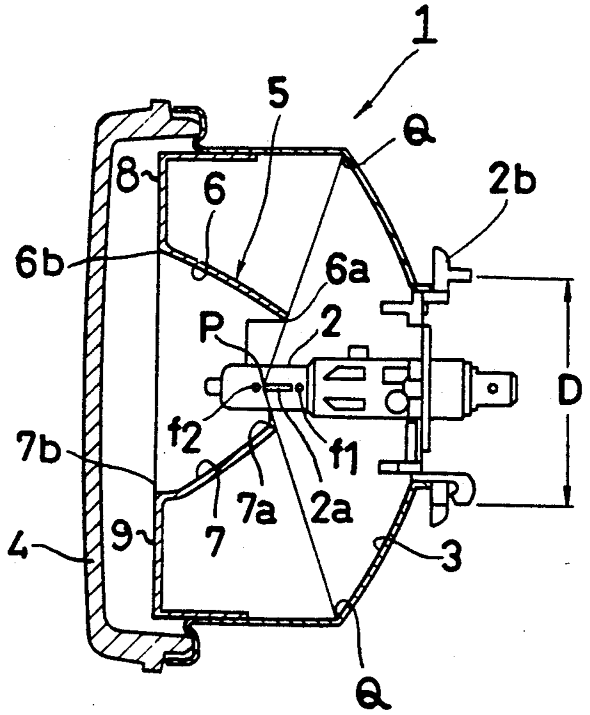
FIG. 1 is a sectional view which illustrates a headlamp for a vehicle including a single filament for radiating a light beam therefrom exclusively for passing-by vehicles in accordance with an embodiment of the present invention.

In FIG. 1, reference numeral 1 generally designates a headlamp for a vehicle (hereinafter referred to simply as a headlamp) which is illustrated by a sectional view. A lamp including a single filament 2a to serve as a light source is employed for the headlamp 1 in order to provide a property of light distribution for radiating a light beam from the filament 2a exclusively for passing-by vehicles in cooperation with a main reflector 3 and a lens 4. With this construction, it becomes possible that the headlamp of the present invention may be used as a headlamp of type 2 which has been described above with respect to the conventional four lamp type headlamp.

It should be noted that e.g., hitherto known means for locating the filament 2a of the lamp 2 at the position offset upward of the focus of the main reflector 3 may be employed for the means for providing the headlamp 1 for radiating a light beam therefrom exclusively for passing-by vehicles. In addition, an essence of the present invention does not consist merely in providing the headlamp 1 for radiating a light beam exclusively for passing-by vehicles. For this reason, a detailed description on the foregoing point of view will not be required.

Figure 2:
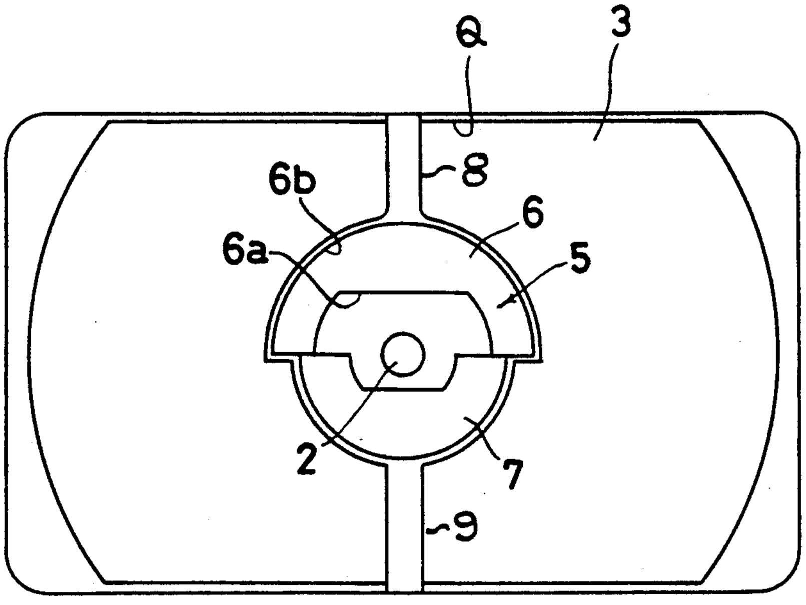
FIG. 2 is a front view of the headlamp in FIG. 1.

According to the present invention, the headlamp 1 is provided with an auxiliary reflector 5 in addition to the main reflector 3 in order to enhance an efficiency of utilizing a light beam radiated from the lamp 2. To compensate reduction of a reflective area of the main reflector 3, it is proposed that the headlamp 1 is formed in the slender rectangular shape extending in the lateral direction as is best seen in FIG. 2, while taking into account the present design of an automotive vehicle.

Next, the structure of the auxiliary reflector 5 will be described in more detail below. As is apparent from the drawings, the auxiliary reflector 5, which is supported by straps 8 and 9, is divided into two parts, i.e., an upper auxiliary reflector 6 and a lower auxiliary reflector 7 along a horizontal line extending through the filament 2a of the lamp 2 or extending through a position in the vicinity of the same. The upper auxiliary reflector 6 is contoured in the shape of a truncated rotational paraboloid whose f1 is located in the vicinity of the rearmost end of the filament 2a. Similarly, the lower auxiliary reflector 7 is formed in the shape of a truncated rotational paraboloid whose focus f2 is located in the vicinity of the foremost end of the filament 2a.

Here, a positional relationship between the main reflector 3 and the auxiliary reflector 5 will be described below. In practice, the auxiliary reflector 5 is arranged in the region where the main reflector 3 can not completely collect a light beam radiated from the filament 2a. For this reason, the auxiliary reflector 5 is basically arranged such that it does not fully cover the surface of the main reflector 3 therewith.

This arrangement will be described below with respect to the upper auxiliary reflector 6. It is desirable that the upper auxiliary reflector 6 does not shut off the optical passage along which the light beam radiated from the filament 2a reaches the main reflector 3 and moreover it does not shut off the optical passage along which the light beam reflected from the main reflector 3 advances in the direction of radiating the light beam. Thus, the upper auxiliary reflector 6 has an inner diameter 6a and an outer diameter 6b both of which are dimensioned limitatively.

The foregoing limitative dimensional definition will first be described below with respect to the inner diameter 6a. The inner diameter 6a is dimensionally defined such that it is located outward of line segments extending from the foremost end P of the filament 2a to the outermost ends Q of the main reflector 3, i.e., it is located at the position offset toward the lens 4 side. When the main reflector 3 is designed in a so-called rectangular shape with upper and lower end parts cut off therefrom, the upper and lower outermost ends Q of the main reflector 3 include linear line portions, causing the inner diameter 6a of the upper auxiliary reflector 6 to include the same linear line portion as those mentioned above with respect to the outermost ends Q, as shown in FIG. 2.

On the other hand, the outer diameter 6b is dimensionally defined such that the outer diameter 6b is set to substantially the same diameter as that of the region D where the function of a part of the main reflector 3 becomes ineffective due to arrangement of two sockets 2b for the lamp 2.

It should be noted that the above description is intended to explain the fundamental structure of the headlamp of the present invention. However, the present invention should not be limited only to this structure. For example, in a case where it is desirable that the auxiliary reflector 5 side has a priority from the viewpoint of determining a property of light distribution, an alternative arrangement may be made such that the main reflector 3 is fully shut.

Further, the above description is equally applicable to the lower auxiliary reflector 7. Consequently, the whole auxiliary reflector 5 is constructed in the above-described manner.

Next, function and advantageous effects of the headlamp of the present invention constructed as described above will be described below.

Since the auxiliary reflector 5 is arranged in the region outside of the range where the main reflector 3 collects a light beam radiated from the filament 2a, this arrangement makes it possible to provide a bright headlamp which assures that a light beam utilization rate of the whole headlamp 1 is improved substantially. According to this arrangement of the auxiliary reflector 5, since the focus of the upper auxiliary reflector 6 is located in the vicinity of the rearmost end of the filament 2a and the focus of the lower auxiliary reflector 7 is located in the vicinity of the foremost end of the filament 2a, a light beam from each of the upper and lower auxiliary reflectors 6 and 7 is oriented in the downward diagonal direction.

As described above, according to the present invention, the headlamp includes a single filament for radiating a light beam therefrom exclusively for passing-by vehicles and the auxiliary reflector is divided into two parts, i.e., an upper auxiliary reflector and a lower auxiliary reflector along a horizontal line extending through the filament such that the focus of the upper auxiliary reflector is located in the vicinity of the rearmost end of the filament and the focus of the lower auxiliary reflector is located in the foremost end of the filament. Thus, the headlamp of the present invention as constructed in the above-described manner assures that a quantity of a light beam from the auxiliary reflector is increased and all of the light beam reflected from the auxiliary reflector is oriented in the slantwise downward direction, whereby the aforementioned requirement for providing a headlamp for a vehicle including a single filament for radiating a light beam therefrom exclusively for passing-by vehicles is met satisfactorily.

While the present invention has been described above only with a single preferred embodiment thereof, it should of course be understood that the present invention should not be limited only to this embodiment but various changes or modifications may be made without departure from the scope of the invention as defined by the appended claims.

What is claimed is:

1. In a headlamp for a vehicle including a single filament, a main reflector in the shape of a truncated rotational paraboloid with upper and lower end parts cut off therefrom to assume a slender rectangular shape adapted to extend in the lateral direction of the vehicle, an auxiliary reflector in the shape of a rotational paraboloid of which focus is located at the position assumed by said filament or at the position in the vicinity of the foregoing position and a lens arranged at the forward end of the headlamp, the improvement wherein;

said filament serves as a filament for radiating a light beam therefrom exclusively for passing-by vehicles, said filament having a forward end closer to said lens and a rearward end further removed from said lens;

said auxiliary reflector being divided into two parts, i.e., an upper auxiliary reflector part and a lower auxiliary reflector part, along a substantially horizontal plane extending through said filament or the position in the vicinity of the same, and said upper auxiliary reflector part arranged above said horizontal plane having a focus which is located at a position in the vicinity of the rearward end of the filament and said lower auxiliary reflector part arranged below said horizontal line having a focus which is located at a position in the vicinity of the forward end of the filament.

2. The headlamp as claimed in claim 1, wherein said auxiliary reflector is arranged in the region where said main reflector can not completely collect a light beam radiated from said filament.

3. The headlamp as claimed in claim 1, wherein said upper auxiliary reflector part is contoured in the shape of a truncated rotational paraboloid whose focus is located at a position in the vicinity of the rearward end of the filament.

4. The headlamp as claimed in claim 3, wherein said truncated upper auxiliary reflector has an inner diameter and an outer diameter, said inner diameter being dimensionally defined such that it is located on the lens side outward of line segments extending from the forward end of the filament to the outermost end of the main reflector, and said outer diameter being substantially the same diameter as that of the region where the function of a part of the main reflector becomes ineffective due to arrangement of a socket assembly for receiving and supporting the filament.

5. The headlamp as claimed in claim 1, wherein said lower auxiliary reflector is contoured in the shape of a truncated rotational paraboloid whose focus is located at a position in the vicinity of the forward end of the filament.

6. The headlamp as claimed in claim 5, wherein said lower auxiliary reflector has an inner diameter and an outer diameter, said inner diameter being dimensionally defined such that it is located on the lens side outward of line segments extending from the forward end of the filament to the outermost end of the main reflector, and said outer diameter being substantially the same diameter as that of the region where the function of a part of the main reflector becomes ineffective due to arrangement of a socket assembly for receiving and supporting the filament.

7. A headlamp for vehicles comprising:

a single filament arranged along a central axis;

a main reflector cooperating with said filament and having upper and lower portions thereof removed to define a generally rectangular shaped perimeter comprised of two linear and substantially parallel upper and lower perimeter portions and two substantially curved side perimeter portions;

a lens positioned over said reflector such that light emitted from said filament is reflected from said main reflector whereby the reflected light passes through said lens;

an auxiliary reflector positioned a predetermined distance in front of said main reflector and between said lens and said main reflector and having a substantially centrally located opening;

said filament extending through said central opening; and said auxiliary reflector having upper and lower reflecting surface portions arranged respectively above and below said central axis, each having a predetermined focus, the focus of the upper surface being different from the focus of the lower surface portion and wherein the focus of each auxiliary reflector surface portion is chosen to direct light from said filament and impinging upon the upper and lower auxiliary reflector surface portions through said lens in a downward diagonal direction relative to said central axis.

8. The headlamp of claim 7 wherein the point representing the focus of one of said auxiliary reflector surface portions is in the vicinity of a portion of the filament closer to said lens and wherein the point representing the focus of the other one of said auxiliary reflector portions is in the vicinity of a portion of the filament further removed from said lens.

* * * * *